US012762937B2

(12) United States Patent
Wood

(10) Patent No.: US 12,762,937 B2
(45) Date of Patent: Oct. 13, 2026

(54) SYSTEM AND METHOD FOR MONITORING KITCHEN SAFETY AND SECURITY

(71) Applicant: INTERGALACTIC AI RESEARCH LLC, Rochester, NY (US)

(72) Inventor: Anthony David Wood, Rochester, NY (US)

(73) Assignee: Intergalactic AI Research LLC, Rochester, NY (US)

( * ) Notice: Subject to any disclaimer, the term of this patent is extended or adjusted under 35 U.S.C. 154(b) by 0 days.

(21) Appl. No.: 18/914,445

(22) Filed: Oct. 14, 2024

(65) Prior Publication Data

US 2025/0349196 A1 Nov. 13, 2025

Related U.S. Application Data

(60) Provisional application No. 63/646,127, filed on May 13, 2024.

(51) Int. Cl.

| | |
|---|---|
| ***G08B 21/02*** | (2006.01) |
| ***G06V 20/52*** | (2022.01) |
| ***G06V 40/10*** | (2022.01) |
| ***G06V 40/20*** | (2022.01) |
| ***G08B 21/24*** | (2006.01) |

(52) U.S. Cl.
CPC ............. *G08B 21/02* (2013.01); *G06V 20/52* (2022.01); *G06V 40/10* (2022.01); *G06V 40/20* (2022.01); *G08B 21/245* (2013.01)

(58) Field of Classification Search
CPC ...... G08B 21/02; G08B 21/245; G06V 20/52; G06V 40/10; G06V 40/20
See application file for complete search history.

(56) References Cited

U.S. PATENT DOCUMENTS 11,373,510 B1 * 6/2022 Valverde ............ G06K 7/10366
2008/0131332 A1 * 6/2008 Nguyen .................... A61L 2/24 422/119
2008/0303658 A1 * 12/2008 Melker .................. G16H 40/20 340/540
2014/0104062 A1 * 4/2014 Weiner ................. G08B 21/245 340/573.1
2015/0194043 A1 * 7/2015 Dunn ................... G08B 21/245 340/573.1

(Continued)

OTHER PUBLICATIONS

PCT International Search Report, Form PCT/ISA/210, for International Application PCT/US2025/029121, Jul. 28, 2025 4 (pages).

(Continued)

*Primary Examiner* — Curtis J King
(74) *Attorney, Agent, or Firm* — Pauley Erickson & Swanson

(57) ABSTRACT

A commercial kitchen monitoring system and method of operation or use. The system includes a plurality of computer vision cameras, a plurality of sensors, and a control system in combination with the computer vision cameras and sensors. The control system includes a feedback generator configured to automatically analyze video and sensor data and determine hygiene violations and/or safety risks. An alert module is configured to deliver information on the hygiene violations and/or safety risks. The alerts can be delivered to a worker in violation in real-time, or to management.

18 Claims, 4 Drawing Sheets

(56) References Cited

U.S. PATENT DOCUMENTS

| | | | | |
|---|---|---|---|---|
| 2017/0004357 | A1 | 1/2017 | Bilet et al. | |
| 2018/0189700 | A1 | 7/2018 | Fuke et al. | |
| 2019/0147730 | A1* | 5/2019 | Shoari | G08B 21/182 340/870.07 |
| 2019/0251825 | A1* | 8/2019 | Sahud | G06M 1/27 |
| 2020/0302775 | A1* | 9/2020 | Liu | G06K 7/10366 |
| 2021/0174665 | A1* | 6/2021 | Shoari | G01K 1/024 |
| 2021/0295673 | A1* | 9/2021 | Liu | G16H 50/80 |
| 2022/0238004 | A1* | 7/2022 | Shoari | G01K 1/024 |
| 2023/0014548 | A1* | 1/2023 | Podvent | G08B 21/245 |
| 2023/0143628 | A1* | 5/2023 | Yee | G16H 50/70 705/2 |
| 2023/0196900 | A1 | 6/2023 | Kelly | |
| 2024/0428559 | A1* | 12/2024 | Keen | G06V 10/82 |
| 2025/0333942 | A1* | 10/2025 | Rothschild | A47K 7/04 |

OTHER PUBLICATIONS

PCT Written Opinion of the International Searching Authority, Form PCT/ISA/237, for International Application PCT/US2025/029121, Jul. 28, 2025 9 (pages).

* cited by examiner

SYSTEM AND METHOD FOR MONITORING KITCHEN SAFETY AND SECURITY

CROSS REFERENCE TO RELATED APPLICATION

This application claims the benefit of U.S. Provisional Patent Application, Ser. No. 63/646,127, filed on 13 May 2024. The provisional application is hereby incorporated by reference herein in its entirety and is made a part hereof, including but not limited to those portions which specifically appear hereinafter.

BACKGROUND OF THE INVENTION

This invention relates generally to risk reduction and mitigations in commercial food preparation and, more particularly, to a system and method employing sensors and surveillance cameras for surveillance and intervention.

Despite significant advances in workplace safety, standards, and surveillance technology, ensuring comprehensive sanitation and safety in commercial kitchens remains a challenge. Existing systems depend heavily on human supervision which is expensive, difficult to scale, and error prone. Food safety auditors or inspectors typically visit a commercial kitchen only once per quarter, at best. Furthermore, visits are short (often less than one day), and occur during regular business hours. The sparsity of these visits generates a profoundly incomplete picture of a kitchen's overall safety and hygiene. Rare but severe events are unlikely to be captured in a short quarterly visit, and more routine violations occur with less frequency during audits because of observer effects. In addition, auditors or inspectors typically do not observe kitchens during peak volume (such as holidays) or non-standard business hours (such as nights or weekends) when violation risk may be high due to staff who are tired, inexperienced, or overworked.

There is a continuing need for improved safety systems for monitoring commercial food preparation.

SUMMARY OF THE INVENTION

A general object of the invention is to provide a system and method of monitoring the safety and security of commercial food preparation. The system incorporates sensors (e.g., motion and/or temperature), computer vision cameras, desirably paired with single board computers, and a central control/processing system, desirably incorporating artificial intelligence. The system and method of this invention reduces the frequency, severity, and impact of physical injury, foodborne illness, and/or other adverse events attributable to unsafe or unhygienic conditions. In real-time, deep computer vision systems are used to identify hygiene violations (e.g., poor/incomplete handwashing, poor sanitation, or cross-contamination) and physical safety risks (e.g., a wet or greasy floor), while embedded sensors identify equipment malfunctions (e.g., a hot food tray holding food at unsafe temperatures). Data from this surveillance system is then used to inform proactive and reactive decision support systems to improve the health and safety of workers and consumers.

The general object of the invention can be attained, at least in part, through a commercial kitchen monitoring system and methods of operation thereof. The system includes a plurality of computer vision cameras and a plurality of sensors, for distribution in areas of the kitchen to detect worker activity, movement, and/or equipment functions/temperatures. A control system is in combination with the computer vision cameras and sensors. The control system includes a feedback generator, such as an artificial intelligence feedback generator, configured to automatically analyze video and/or sensor data and determine hygiene violations and/or safety risks, as a function of the worker activity, movement, and/or equipment functions/temperatures. An alert module, in combination with the control system delivers information on the hygiene violations and/or safety risks.

In embodiments, the information includes targeted (e.g., relevant) correction interventions for the hygiene violations and/or safety risks. The information can be delivered to a person who is in violation and/or a kitchen manager. The information can be delivered to an electronic device (e.g., phone) of the worker or manager, or through dedicated electronic displays connected to the system and dispersed in key kitchen areas (such as hand-washing stations). In embodiments, the control system includes a risk prediction module and the information comprises preventative interventions delivered upon a predicted safety risk.

The system sensors desirably include temperature sensors in combination with equipment and/or food products. For example, temperature sensors can be placed in refrigerated food storage, ovens, and food warming areas (e.g., waiting to be served). The computer vision cameras are desirably ceiling mountable over key kitchen areas of safety or contamination concern, for example, a cooking station or a hand washing station. In embodiments, the feedback generator monitors worker hand washing and alerts a worker (e.g., in real-time) if a hand washing is not in compliance with a predetermined hygiene standard.

In embodiments of this invention, the system includes a predetermined state-space model configured to match a kitchen installation and/or operation. The state-space model desirably divides the kitchen space into a plurality of regions or stations, each identified for a particular kitchen purpose. An artificial intelligence feedback generator can monitor movement in and between the plurality of regions or stations. Each of the plurality of regions or stations can be predetermined as a safe food region or a risky food region. A risky food region can, for example, include raw food or allergens, and the artificial intelligence feedback generator monitors movement of people and equipment from the risky food region to the safe food regions. In embodiments, at least one of the plurality of regions or stations, and/or a food container, is predetermined as being allergen-free.

In embodiments, the feedback generator identifies spills and obstacles within the kitchen. Additionally or alternatively, the feedback generator desirably monitors worker motion and worker posture within the kitchen to identify fatigue and injury risk. The feedback generator can also extract patterns from accumulated hygiene and safety data to identify people, kitchens, and operating times of increased safety concern. Again, this is all preferably performed using AI, in real-time.

The invention further includes a method of monitoring a commercial kitchen. The method includes steps of: placing a computer vision camera over each hand washing station; placing a computer vision camera over each of a plurality of kitchen food preparation stations; placing a temperature sensor in combination with each of a plurality of kitchen cooking equipment; monitoring each of the cameras and sensors with a control system including a feedback generator (e.g., AI-based) configured to automatically analyze video and sensor data and determine hygiene violations and/or safety risks; and alerting a kitchen worker on the hygiene violations and/or safety risks. The method desirably also includes delivering targeted correction interventions for the hygiene violations and/or safety risks, to a person in violation and/or a kitchen manager.

In embodiments, the feedback generator monitors worker hand washing and the method includes alerting a worker if a hand washing is not in compliance with a predetermined hygiene standard. The method further desirably includes automated: monitoring of movement in and between a plurality of regions or stations of a predetermined state-space model configured to match a kitchen installation, the plurality of regions or stations each identified for a particular kitchen purpose; monitoring movement of food and equipment between a risky food region and a safe food region; and/or identifying spills and obstacles within the kitchen.

In embodiments, the method includes automatically extracting patterns from accumulated hygiene and safety data to identify people, kitchens, and operating times of increased safety concern. This can be reported to management and/or kitchen owners for use in mitigating these concerns.

The system and method of this invention can be operated centrally by a local or remote processing system, such as a server computer at the restaurant. Analytics can be deployed either on-site, in the cloud, or a combination of both, depending on various factors. In embodiments, analytics data are stored and processed locally on the equipment installed on-site. This approach allows us to handle tasks that require rapid processing, completing them in microseconds, while slower, more complex analysis can be transmitted to cloud servers for further processing. This hybrid model enables offering a wide range of analytics while managing a performance load on the on-site hardware and minimizing the cost of computing for cloud servers (e.g., AWS).

Other objects and advantages will be apparent to those skilled in the art from the following detailed description taken in conjunction with the appended claims and drawings.

DETAILED DESCRIPTION OF THE INVENTION

The invention provides a holistic and comprehensive (and fully automatic) monitoring and intervention system for commercial kitchens that protects consumers from foodborne pathogens while improving worker safety and increasing efficiency.

The present invention combines artificial intelligence (AI) and embedded sensors and cameras to provide surveillance, and a decision support system to enhance the safety and hygiene of commercial kitchens. The system and method of this invention provide continuous monitoring, risk identification, and risk mitigation that is neither feasible nor available with human auditor-based systems. This system increases kitchen hygiene, decreases the risk of preventable foodborne illness, and improves worker safety. In addition, this system can used for shrinkage reduction and adaptive (i.e., data-driven) equipment maintenance.

In embodiments, the system includes computer vision and embedded sensors to identify hygiene violations and safety risks, and real-time AI-driven feedback to mitigate hygiene or safety risks, such as alerting a worker that their handwashing is/was not compliant (e.g., with CDC/FDA or WHO standards), that cross-contamination has occurred, or that the temperature of a food is not in a safe range. Embodiments of the invention further include targeted interventions for kitchen managers and workers to improve hygiene and safety based on accumulated data in their own kitchen or network of kitchens (e.g., a review of the CDC/FDA or WHO handwashing standards for workers with consistent violations of these standards) and/or recommendations for maintenance/replacement of equipment.

Figure 1:
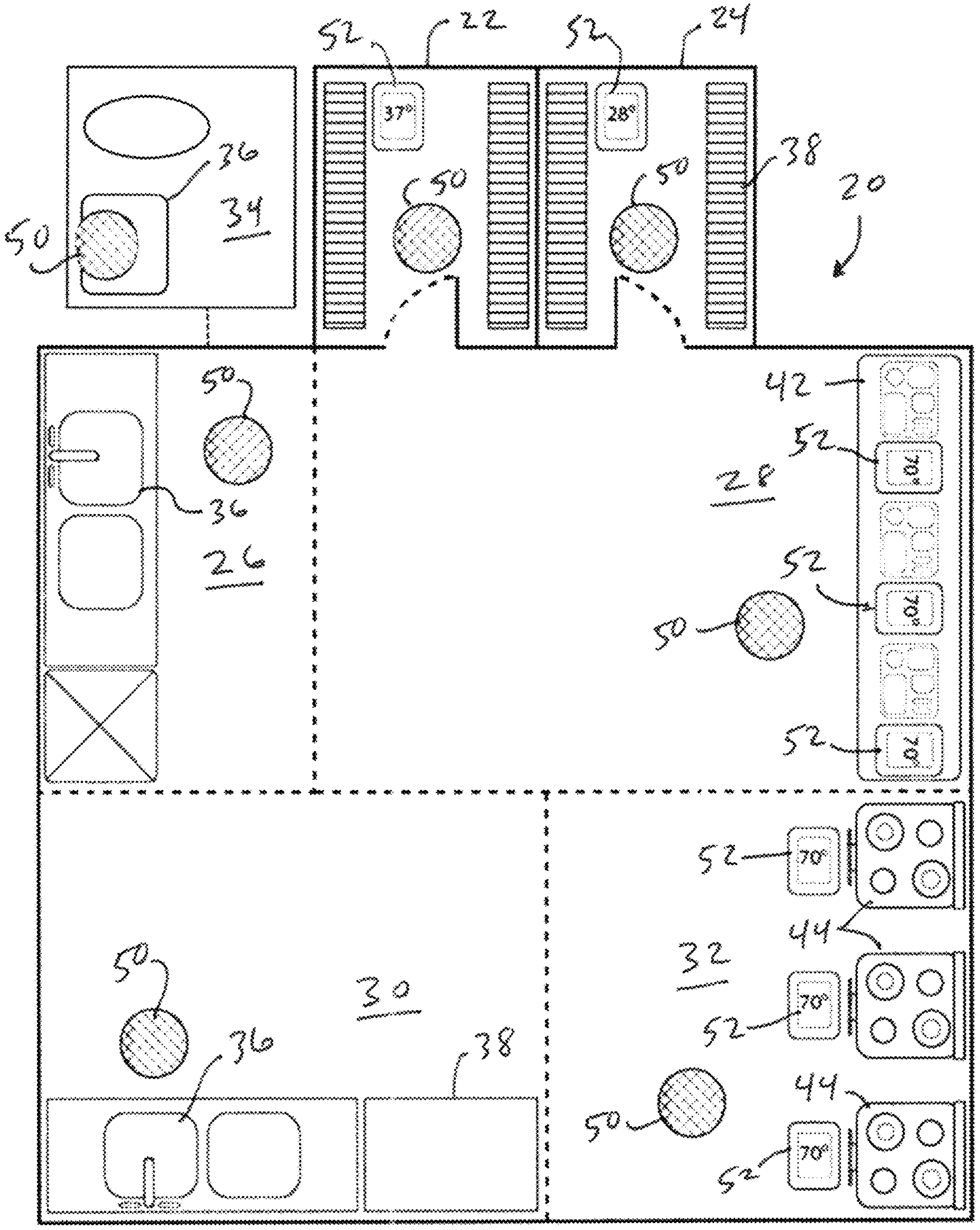
FIG. 1 shows a system in a representative kitchen space, according to embodiments of this invention.

FIG. 1 illustrates a system installation according to embodiments of this invention in a representative commercial kitchen 20. The kitchen 20 includes several areas, such as a refrigerator 22, a freezer 24, a dishwashing area 26, a service area 28 for holding and/or distributing food to servers, a food preparation area 30, and a main cooking area 32. Although not likely directly attached, the kitchen employees have access to a restroom 34. The system of this invention includes or is connected to a plurality of cameras, preferably computer vision cameras 50, and a plurality of sensors, such as temperature sensors 52. As illustrated, the cameras 50 are placed near, and preferably over, areas of action, such as hygiene-relevant areas including sinks 36, or safety areas such as food storage 38 and ovens 44, or areas of inter-employee transfer, such as food warming counter 42. Temperature sensors 52 are generally placed where specific temperatures are needed for food and cooking safety, such as refrigerator 22, freezer 24, ovens 44, and food warming counter 42.

Figure 2:
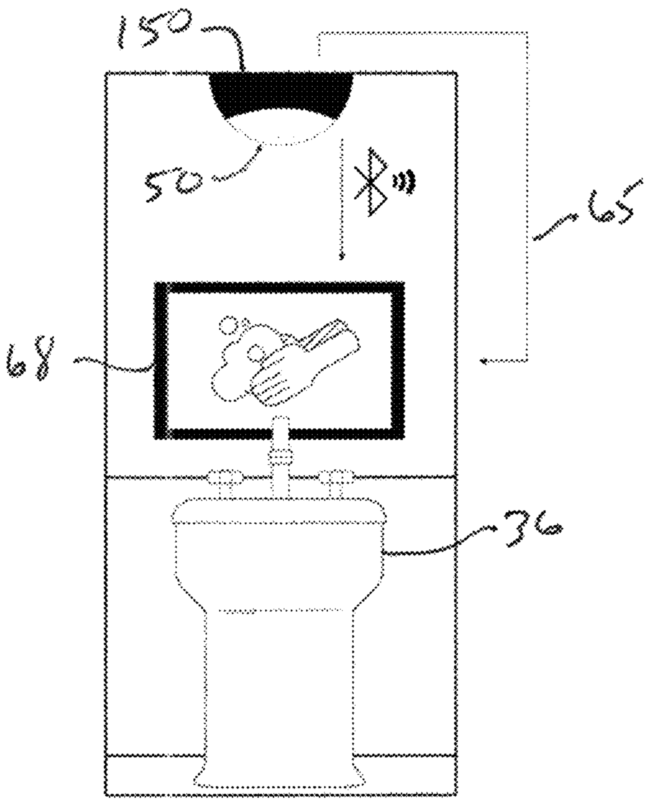
FIGS. 2 and 3 illustrate a hand-washing station, according to embodiments of this invention.
Figure 3:
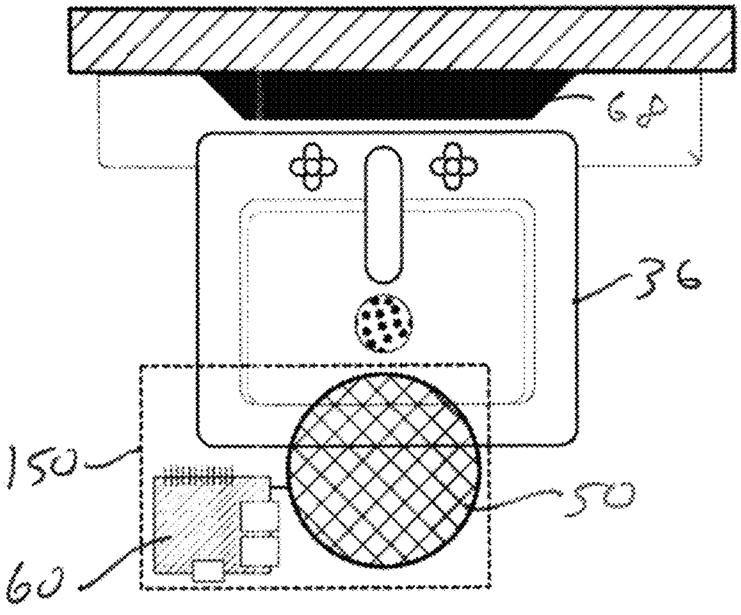
Figure 4:
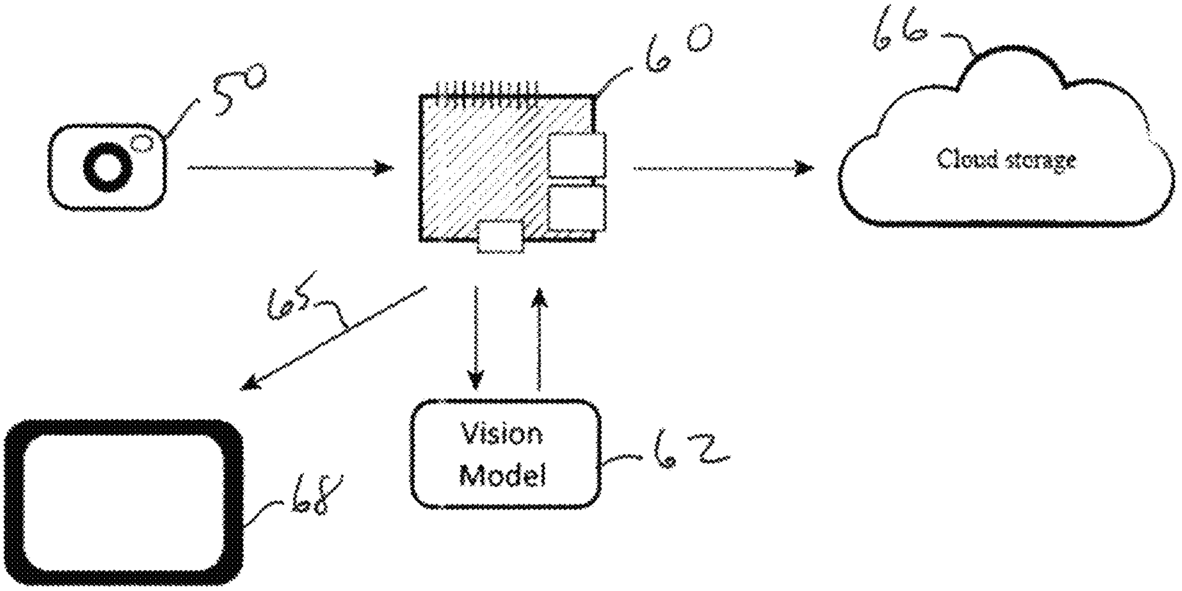
FIG. 4 is a general schematic of the communication within the system according to embodiments of this invention.
Figure 5:
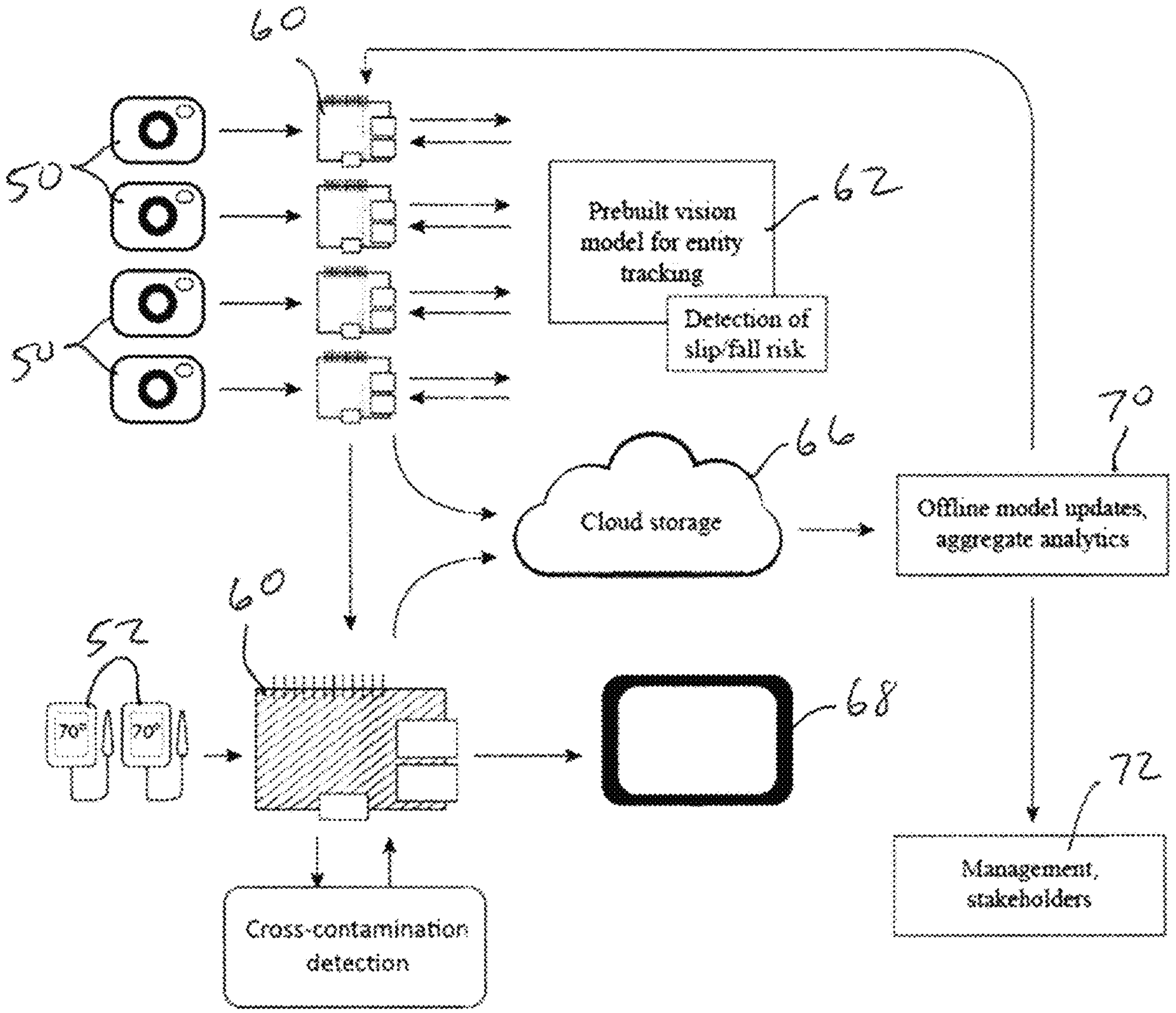
FIG. 5 is a general schematic for region-based monitoring for cross-contamination and safety risks, according to embodiments of this invention.

FIGS. 2 and 3 illustrate a camera 50 positioned relative to a sink 36. Proper handwashing is a cornerstone of food safety and kitchen hygiene. Unfortunately, compliance with established standards (such as those published by the World Health Organization (WHO), Centers for Disease Control and Prevention (CDC), or Food and Drug Administration (FDA)) is notoriously low in commercial kitchens. Poor hygiene is associated with a dramatic increase in risk of foodborne illness which in turn is a significant cause of mortality and morbidity across the world. Thus, improving handwashing in commercial kitchens has the potential for tremendous positive public health and economic impacts.

As shown in FIGS. 2-5, a computer vision camera system 150 is used to identify non-compliance with a set of specified handwashing standards. An overhead camera 50 captures handwashing behavior which is processed by an onboard single-board computer 60 which employs a pre-trained deep vision model 62 that identifies deviations from a target handwashing protocol. Facial recognition or detectable identification badges can be used to identify a handwasher. Data collected by the camera 50 is then sent to cloud storage 66 where it can be combined with other accruing data (see below) to create aggregate summaries for a single kitchen 20 or network of kitchens. Furthermore, this data can be subject to human- and AI-based labeling to refresh and fine-tune underlying models. Updates to the vision model can be pushed directly to the single-board computer via wireless networking (e.g., Wi-Fi). In embodiments, real-time feedback 65 is provided to the hand-washer through a digital display 68 positioned above the sink 36, such as alerting the hand-washer that more washing is needed, or that a sufficient washing time has been reached. The system can also optionally monitor soap dispensing/usage to ensure compliance.

A vast majority of severe foodborne illness is caused by cross-contamination or poor sanitation of surfaces and equipment. A single transference of pathogens to food can result in a major outbreak. Primary pathways of cross-contamination are human-to-food, food-to-food, and equipment-to-food. The system of this invention can be used to identify and monitor each of the foregoing pathways, by combining AI-driven computer vision and embedded sensing.

As noted in FIG. 1, the kitchen 20 is divided into regions, such as based upon kitchen function, and generally designated by dashed dividing lines. In embodiments of this invention, the kitchen 20 is partitioned into food preparation region 30, cooking region 32, service (prepared food) region 28, and washing region 26, and the system tracks the movement of people, food, and equipment between these regions. Furthermore, the system can use a dynamic state-space model to identify if and when a region becomes unsafe because of the possible presence of a pathogen. For example, a food preparation station with raw chicken is considered unsafe until it has been properly cleaned and sanitized. Anything that enters an unsafe region itself becomes unsafe until remedial actions are taken, e.g., a worker's apron is changed and their hands thoroughly washed, or raw chicken is cooked to a safe temperature (validated by a wirelessly connected smart thermometer), etc.

Embodiments of this invention include a rule-based system that dynamically classifies entities (person, equipment, food, etc.) and region as being safe or unsafe at each point in time. Some entities are inherently unsafe, e.g., raw meat, expired or spoiled food, unwashed hands after a bathroom visit, etc. A safe region or entity becomes unsafe when it contacts an unsafe entity. An unsafe region or entity becomes safe after undergoing a safety procedure (e.g., cooking to safe temperature, cleaning and sanitizing, discarding, etc.). A cross-contamination event occurs when an unsafe entity enters a prepared food area. The system can use the series of wireless overhead cameras 50 with single-board computers 60 to track the movement of entitles across regions of the kitchen 20. Portable sensors such as a smart thermometers and/or adenosine-5'-triphosphate (ATP) sensors can be used to check the safety of cooked food and indicate the presence of contamination, such as pathogens.

Entity tracking can be performed using pre-trained deep computer vision models running asynchronously on the single board computers 60 connected to each camera 50. Sparse message passing via a wireless network can be used to track entities across regions covered by each camera 50. Thus, the system can identify the entrance of an unsafe entity into the prepared food area so that cross-contamination events are identified in real-time. Data are compressed and pushed, such as via a local control server/computer, to cloud storage 66 where they are aggregated and used to refine entity tracking models and to create summaries and preventative intervention strategies The system components for tracking cross-contact can also be used to prevent the introduction of allergens to foods that are not allergenic. For example, if allergens (e.g., gluten or shellfish) are kept in color-coded or otherwise identifiable containers, they can be tracked in the same way as other unsafe entities. Similarly, food, equipment, or regions in the kitchen can be identified as allergen-free zones. Allergen contamination occurs when there is contact between an allergen unsafe entity and an allergen-free zone.

Sensors, such as smart thermometers 52, can be used to monitor temperatures in food trays, ovens, cold storage, and to probe cooked food. When active, each device produces a high-frequency stream of measurements which are sent, e.g., via Bluetooth, to one or more of the single-board computers 60 distributed throughout the kitchen 20. Overhead cameras 50 along with computer vision models automatically identify context (i.e., the food being monitored) and target temperature ranges. Using the smart thermometer measurements and an AI-identified context, deviations from a safe temperature range can be detected and remedied before they pose a health risk to consumers. While the primary purpose of these readings is to reduce the risk of foodborne illness caused by thermophilic pathogens, a secondary benefit is the ability to identify faulty or failing equipment. For example, high-frequency temperature readings can be used to identify an oven with cold spots, inconsistent temperature control, or a food tray with uneven heating. Each logged temperature violation includes a unique equipment identifier so that equipment with frequent temperature violations can thus be identified for maintenance or replacement.

Embodiments of the invention also seek to address two common causes of workplace injury in a commercial kitchen: 1) slips and falls due to slippery floors, obstacles, or improper footwear; and 2) musculoskeletal disorders (MSDs) due to unsafe or repetitive movements. Slips and falls are a common cause of acute worker injury. The network of cameras 50 can use streaming data coupled with the computer vision models for entity tracking to identify in real-time spills or slippery spots (e.g., grease from a sputtering pan accumulating on the floor) as well as obstacles that may pose a tripping hazard. Emerging risk factors are communicated immediately to workers and management who can assess and respond.

The system can also include motion tracking and pose estimation algorithms to track fatigue and injury risk, e.g., by identifying awkward or extreme postures. This information can be used to inform worker wellness through ergonomic interventions (teaching safer movements), stretching or active recovery activities, or task rotation.

Similar to the handwashing display prompts discussed above, embodiments of the invention can include real-time intervention systems and/or behavioral nudges. The system of this invention can include both reactive and preventative interventions to mitigate safety or hygiene risks. Reactive interventions are issued after a safety or hygiene event has occurred, e.g., an alert containing remediation instructions is issued when cross-contamination occurs, or when a worker is not compliant with handwashing protocols. These interventions are driven by the computer vision systems described herein, which identify, in real-time, violations and then passes them to a look-up table containing remediation instructions. Alerts can be delivered to dedicated devices/displays or forwarded to electronic devices of employees or management.

Preventative interventions are desirably issued when the estimated risk of a safety or hygiene event is high but has not yet occurred. The system for producing preventative interventions generally includes two components: 1) a risk prediction model; and 2) an adaptive intervention system. The risk prediction model creates real-time predictions for a (user-specified) suite of adverse events. When the risk of an event is above a threshold (which can be automatically tuned to control the false and true alarm rates) the module triggers the intervention system. The intervention system then provides a recommendation to mitigate the risk identified by the prediction model. Whereas as the reactive interventions are based on identification and a set of remediation rules, the preventative intervention system is learned through judicious experimentation.

Accumulated data (possibly aggregated across kitchens within the same organization) are used by online learning algorithms, preferably run in the cloud 66, to train and validate the risk prediction model. Reinforcement learning, a subfield of machine learning focused on sequential decision making under uncertainty, is desirably used to experiment and ultimately learn the timing and nature of interventions to optimally mitigate risk. The invention is modular, allowing for prediction and RL algorithms to be updated 70 as the state-of-the-art advances.

In addition to real-time reactive and preventative interventions, embodiments of the invention use accumulated data to provide a holistic and comprehensive view of kitchen safety and hygiene. AI can be used to extract patterns in both incidences and risk of safety and hygiene violations, e.g., across individuals, shifts, contexts and sites in a corporate or franchise situation, etc., which are then reported to managers and stakeholders 72 though a dashboard. In addition, the system can use these patterns to recommend interventions such as educational training to reduce future incidents.

For an organization with multiple kitchens, statistical analyses within and across stores/sites provide insights into where and when risk is highest. This in turn can be used to inform corrective actions and to send human auditors where and when they will have the most impact. Furthermore, predictive models can be used to anticipate future elevated risk, e.g., if a kitchen's propensity for adverse events increases with customer volume, time series demand models can be used to identify future periods of high volume and thus high risk.

AI-driven monitoring of a commercial kitchen according to this invention can also be used to reduce improper use of equipment, shrinkage, and other violations of a company's policy (e.g., improper footwear).

It will be appreciated by those skilled in the art that the configurations of the disclosed invention, particularly with respect to components, programmed logic, and/or control features disclosed above, include one or more computerized device(s) or the like configured with software and/or circuitry (e.g., a processor) to process any or all of the method operations disclosed herein as embodiments of the invention. Embodiments of the invention include software programs and/or an operating system that can operate alone or in conjunction with each other with a computerized device to perform the method embodiment steps and operations summarized above and disclosed in detail below. One such embodiment includes a computer program product that has a computer-readable storage medium including computer program logic encoded thereon that, when performed in a computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (s) (e.g., during operating system execution or during environment installation) to cause the computerized device(s) to perform the techniques explained herein as embodiments of the invention.

Thus, the invention provides a system and method of use and operation for monitoring safety in a kitchen or other food processing facility. The system allows for relatively easy integration into new or existing kitchens.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A commercial kitchen monitoring system, comprising:
- a plurality of computer vision cameras;
- a plurality of sensors;
- a control system in combination with the computer vision cameras and sensors, the control system including a feedback generator configured to automatically analyze video and sensor data and determine hygiene violations and/or safety risks;
- a predetermined state-space model configured to match a corresponding kitchen installation, the state-space model comprising a plurality of regions or stations each identified for a particular kitchen purpose, wherein the feedback generator and computer vision cameras identify and classify entities within the regions or at the stations, the entities comprising persons, equipment, and food products, and track movement of each of the entities within and between the plurality of regions or stations; and
- an alert module configured to deliver information on the hygiene violations and/or safety risks by any of the entities in real-time.

2. The system of claim 1, wherein the information comprises targeted correction interventions for the hygiene violations and/or safety risks, delivered to a person in violation and/or a kitchen manager.

3. The system of claim 1, wherein the control system comprises a risk prediction module and the information comprises preventative interventions delivered upon a predicted safety risk.

4. The system of claim 1, wherein the sensors comprise temperature sensors in combination with equipment and/or food products.

5. The system of claim 1, wherein the computer vision cameras are ceiling mountable over a cooking station or a hand washing station.

6. The system of claim 1, wherein the feedback generator monitors worker hand washing and alerts a worker if a hand washing is not in compliance with a predetermined hygiene standard.

7. The system of claim 1, wherein each of the plurality of regions or stations are predetermined as a safe food region or a risky food region, the risky food region including raw food or allergens, and the feedback generator monitors movement of people and equipment from the risky food region to the safe food regions.

8. The system of claim 1, wherein at least one of the plurality of regions or stations, and/or a food container, is predetermined as being allergen-free.

9. The system of claim 1, wherein the feedback generator identifies spills and obstacles within the kitchen.

10. The system of claim 1, wherein the feedback generator monitors worker motion and worker posture within the kitchen to identify fatigue and injury risk.

11. The system of claim 1, wherein the feedback generator extracts patterns from accumulated hygiene and safety data to identify people, kitchens, and operating times of increased safety concern.

12. A method of monitoring a commercial kitchen, comprising:

placing a computer vision camera over each hand washing station;

placing a computer vision camera over each of a plurality of kitchen food preparation stations;

placing a temperature sensor in combination with each of a plurality of kitchen cooking equipment;

monitoring each of the cameras and sensors with a control system including a feedback generator configured to automatically analyze video and sensor data and determine hygiene violations and/or safety risks, wherein the feedback generator and computer vision cameras identify and classify entities at the plurality of kitchen food preparation stations, the entities comprising persons, equipment, and food products, and track movement of each of the entities within and between the plurality of kitchen food preparation stations; and alerting a kitchen worker on the hygiene violations and/or safety risks.

13. The method of claim 12, further comprising delivering targeted correction interventions for the hygiene violations and/or safety risks, to a person in violation and/or a kitchen manager.

14. The method of claim 12, wherein the feedback generator monitors worker hand washing and further comprising alerting a worker if a hand washing is not in compliance with a predetermined hygiene standard.

15. The method of claim 12, further comprising monitoring movement in and between a plurality of regions of a predetermined state-space model configured to match a kitchen installation, the plurality of regions each identified for a particular kitchen purpose.

16. The method of claim 12, further comprising monitoring movement of food and equipment between a risky food region and a safe food region.

17. The method of claim 12, further comprising identifying spills and obstacles within the kitchen.

18. The method of claim 12, further comprising extracting patterns from accumulated hygiene and safety data to identify people, kitchens, and operating times of increased safety concern.

* * * * *